United States Patent
Park et al.

(10) Patent No.: US 9,753,769 B2
(45) Date of Patent: Sep. 5, 2017

(54) APPARATUS AND METHOD FOR SHARING FUNCTION LOGIC BETWEEN FUNCTIONAL UNITS, AND RECONFIGURABLE PROCESSOR THEREOF

(71) Applicant: SAMSUNG ELECTRONICS CO., LTD., Suwon-si (KR)

(72) Inventors: Hae-Woo Park, Seoul (KR); Suk-Jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 14/160,756

(22) Filed: Jan. 22, 2014

(65) Prior Publication Data

US 2014/0215476 A1    Jul. 31, 2014

(30) Foreign Application Priority Data

Jan. 28, 2013    (KR) ........................ 10-2013-0009327

(51) Int. Cl.
| | |
|---|---|
| G06F 9/46 | (2006.01) |
| G06F 9/48 | (2006.01) |
| G06F 15/78 | (2006.01) |
| G06F 9/38 | (2006.01) |

(52) U.S. Cl.
CPC .......... *G06F 9/4881* (2013.01); *G06F 9/3877* (2013.01); *G06F 15/7867* (2013.01)

(58) Field of Classification Search
CPC ... G06F 9/4881; G06F 15/7867; G06F 9/3877
See application file for complete search history.

(56) References Cited

U.S. PATENT DOCUMENTS

| | | | |
|---|---|---|---|
| 5,109,356 A * | 4/1992 | Lawton ................. | G06F 17/141 |
| | | | 708/405 |
| 5,838,165 A | 11/1998 | Chatter | |
| 6,627,985 B2 | 9/2003 | Huppenthal et al. | |
| 6,725,354 B1 | 4/2004 | Kahle et al. | |
| 6,781,226 B2 | 8/2004 | Huppenthal et al. | |
| 7,047,534 B2 * | 5/2006 | Sadovsky ............. | G06F 13/102 |
| | | | 719/322 |
| 7,126,214 B2 | 10/2006 | Huppenthal et al. | |
| 7,282,951 B2 | 10/2007 | Huppenthal et al. | |

(Continued)

FOREIGN PATENT DOCUMENTS

| | | |
|---|---|---|
| EP | 1 703 414 A1 | 9/2006 |
| KR | 1020000068256 A | 11/2000 |

(Continued)

OTHER PUBLICATIONS

Communication dated Apr. 24, 2014, from the European Patent Office in counterpart European Application No. 14152782.0.

*Primary Examiner* — Camquy Truong

(74) *Attorney, Agent, or Firm* — Sughrue Mion, PLLC

(57) ABSTRACT

An apparatus and method for sharing a function logic between functional units and a reconfigurable processor are provided. The apparatus for sharing a function logic may include a storage which is configured to store data which is received from two or more functional units in order to share one or more function logics, and an arbitrator which is configured, based on a scheduling rule, to transmit the data stored in the storage into the function logic.

19 Claims, 7 Drawing Sheets

(56) References Cited

U.S. PATENT DOCUMENTS

| | | | |
|---|---|---|---|
| 7,743,236 B2 | 6/2010 | Saito et al. | |
| 8,910,167 B2 * | 12/2014 | Kline | G06Q 40/04 718/100 |
| 9,237,342 B2 * | 1/2016 | Koyama | H04N 19/124 |
| 2004/0103265 A1 | 5/2004 | Smith | |
| 2006/0242385 A1 | 10/2006 | Murakami et al. | |
| 2007/0124563 A1 | 5/2007 | Sekiyama | |
| 2008/0040574 A1 | 2/2008 | Ramesh | |
| 2009/0193238 A1 | 7/2009 | Bang et al. | |
| 2010/0005274 A1 | 1/2010 | Van De Waerdt | |
| 2011/0225595 A1 * | 9/2011 | Chujo | G05B 19/0426 718/106 |

FOREIGN PATENT DOCUMENTS

| | | |
|---|---|---|
| KR | 1020040072645 A | 8/2004 |
| KR | 1020060087836 A | 8/2006 |
| KR | 1020070097051 A | 10/2007 |

* cited by examiner

APPARATUS AND METHOD FOR SHARING FUNCTION LOGIC BETWEEN FUNCTIONAL UNITS, AND RECONFIGURABLE PROCESSOR THEREOF

CROSS-REFERENCE TO RELATED APPLICATION(S)

This application claims priority from Korean Patent Application No. 10-2013-0009327, filed on Jan. 28, 2013, in the Korean Intellectual Property Office, the disclosure of which is incorporated herein by reference in its entirety for all purposes.

BACKGROUND

1. Field

Apparatuses and methods consistent with the following description relate to an apparatus and method for sharing one or more function logics.

2. Description of the Related Art

A reconfigurable processor generally includes a plurality of functional units and/or a plurality of functional modules, and it is normal that the plurality of functional units commonly perform arithmetic operations and provide output according to a mutually independent given input. However, in some cases of the arithmetic operations, a large function logic of hardware is needed, which may give rise to a difficulty in placing a corresponding arithmetic operation in multiple functional units, in terms of a die size and power consumption, and/or other practical considerations. In a case in which predetermined operations are allocated in a minority of the functional units, because one functional unit performs one arithmetic operation at a time, restrictions can be effectively caused with respect to processing performance for applications that have a plurality of corresponding arithmetic operations. In addition, there is typically a need for routing on a circuit or additional communication that transmits an input to the functional unit which is capable of processing the arithmetic operations for processing the given arithmetic operations and which acquires results. However, if there are not a plurality of the functional units to which the corresponding arithmetic operations are allocated, routing resource efficiency may drop and the performance may decrease, because input/output values must be transmitted very far in many cases. Further, the more routings are increased, the more resource efficiencies are increased, and therefore, scheduling has become increasingly difficult.

SUMMARY

One or more embodiments provide an apparatus and method for sharing a function logic between functional units or modules, and a processor thereof.

Accordingly to an aspect of an embodiment, there is provided an apparatus for sharing a function logic, the apparatus including a storage which is configured to store data which is received from at least two functional units in order to share at least one function logic, and an arbitrator which is configured to transmit the stored data to the at least one function logic, based on a scheduling rule.

The apparatus for sharing a function logic may further include an output device which is configured to transmit at least one result which is obtained by the at least one function logic via processing the data which is transmitted by the arbitrator to each of the at least two functional units.

The output device may include a buffer which is configured to temporarily store the obtained at least one result.

The output device may be further configured to store the obtained at least one result in the buffer for a predetermined amount of time, and then to transmit the at least one result to each of the at least two functional units.

The at least two functional units may be included in at least one reconfigurable processor.

Each respective one of the at least two functional units may belong to a corresponding one of at least two functional unit groups which are configured to concurrently process at least two tasks in one reconfigurable processor.

The storage may include at least two queues which respectively correspond to the at least two functional units, and which are configured to store the data to be transmitted from each of the at least two functional units to the at least one function logic.

The storage may include at least one queue which is configured to store data to be transmitted to the at least one function logic from at least one hardware device that shares the at least one function logic.

Each of the at least one function logic may be configured to perform a same operation.

According to an aspect of another embodiment, there is provided a reconfigurable processor including a plurality of functional units, at least two queues which are respectively configured to store data which is received from a corresponding one of at least two functional units from among the plurality of functional units, the at least two functional units being connected in order to share at least one function logic, an arbitrator which is configured to transmit the stored data to the at least one function logic, based on a scheduling rule, and an output device which is configured to transmit at least one result which is obtained by the at least one function logic via processing the data which is transmitted by the arbitrator to each of the at least two functional units.

The output device may include a buffer which is configured to temporarily store the obtained at least one result and, based on a scheduling rule, to store the obtained at least one result in the buffer for a predetermined amount of time, and to transmit the obtained at least one result to each of the at least two functional units.

Each of the plurality of functional units may be designated as belonging to a respective one of at least two functional unit groups which are configured to concurrently process at least two tasks, and each respective one of the at least two functional units may be included in a corresponding one of the at least two functional unit groups.

According to an aspect of another embodiment, there is provided a method for sharing a function logic, the method including storing data, which is received from at least two functional units in order to share at least one function logic in a respective one of at least two queues which correspond to the at least two functional units, and transmitting the stored data to the at least one function logic based on a scheduling rule.

The method may further include transmitting at least one result which is obtained by the at least one function logic via processing the transmitted data to each of the at least two functional units.

The transmitting the obtained at least one result to each of the at least two functional units may include storing the obtained at least one result in a buffer for a predetermined amount of time.

The at least two functional units may be included in at least one reconfigurable processor.

Each respective one of the at least two functional units may belong to a corresponding one of at least two functional unit groups which are configured to concurrently process at least two tasks in one reconfigurable processor.

Each of the at least one function logic may be configured to perform a same operation.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
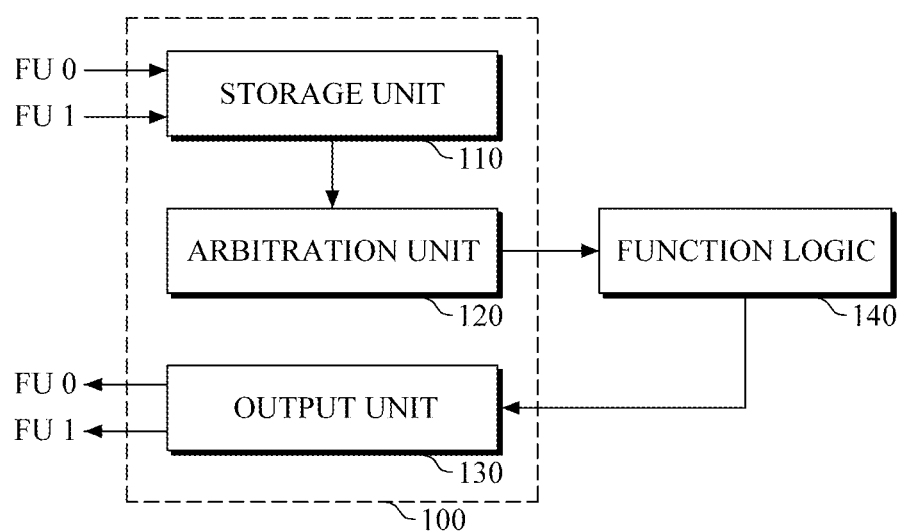
FIG. 1 is a block diagram which illustrates an apparatus for sharing a function logic according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Throughout all descriptions of the specification, an identical reference number refers to an identical component.

Throughout the drawings and the detailed description, unless otherwise described, the same drawing reference numerals will be understood to refer to the same elements, features, and structures. The relative size and depiction of these elements may be exaggerated for clarity, illustration, and convenience.

Examples of an apparatus and method for sharing a function logic, and reconfigurable processor are provided hereafter in detail, referring to figures as illustrated.

FIG. 1 is a block diagram which illustrates an apparatus for sharing a function logic according to an exemplary embodiment. In general, when designing a reconfigurable processor, a function logic which is able to perform a predetermined operation may be included only within a range of a predetermined number thereof, because of restrictions relating to practical considerations, such as, for example, a die size. In an exemplary embodiment, an apparatus 100 for sharing a function logic may enable one or more functional units FU0 and FU1 to share a function logic 140 that processes a predetermined operation, as shown in FIG. 1, and thereby allow an increase in the number of functional units that support the predetermined operation, while causing only minimal overhead due to sharing.

Referring to FIG. 1, an apparatus 100 for sharing a function logic includes a storage unit (also referred to herein as a storage) 110, an arbitration unit (also referred to as an arbitrator) 120 and an output unit (also referred to herein as an output device) 130.

A storage unit 110 stores data from two or more functional units FU 0 and FU 1 that share a function logic 140 which processes the data. In particular, the storage unit 110 may include two or more queues that respectively correspond to two or more functional units FU0 and FU1, and data which is received from each functional unit may be stored in the particular queue which corresponds to the particular functional unit. The storage 110 may be embodied as a storage device, such as, for example, any device or component which is configured for storing data. The functional units are configured to execute a particular function, and may be embodied as hardware modules or components, such as processors or dedicated circuitry, or as software modules or programs.

An arbitration unit 120 may transmit, to the function logic 140, pieces of data which have been inputted to the storage unit 110 from each of the functional units FU 0 and FU 1, in order to be shared, according to a scheduling rule, and thereby help the function logic 140 to process the data. In particular, the scheduling rule may include information which relates to an order to transmit data which is received from each functional unit to the function logic 140 to be shared. The arbitration unit 120 may transmit data which is inputted to each queue, to the function logic 140, based on the information which relates to the order. The arbitrator 120 is configured to perform an arbitration function, and may be embodied, for example, as a hardware component or module, such as a processor or dedicated circuitry, or as a software module or program.

Further, in an exemplary embodiment, the function logic 140 to be shared may include two or more function logics, and in case of being designed to share two or more function logics 140, each function logic 140 may process an identical operation. In this aspect, a design which is configured to share two or more function logics 140, which process the identical operation, will perform faster processing than a design which is configured to process the identical operation after the arbitration unit 120 transmits data which has been inputted to each queue to one of the function logics 140.

In addition, in an exemplary embodiment, a function logic 140 which is configured to process a predetermined operation may be connected to an arbitration unit 120 and an output unit 130 by being included on the outside of the hardware of an apparatus 100 for sharing a function logic, as illustrated in FIG. 1. Further, in another exemplary embodiment, a function logic may be designed as one element of the apparatus 100 for sharing a function logic.

An output unit 130 transmits one or more results, which are obtained by the function logic 140 via processing of data which has been transmitted by the arbitration unit 120, to a functional unit which has received and stored the data in the storage unit 110. For example, when the arbitration unit 120 transmits data which has been stored by one functional unit FU 0 to the function logic 140 according to the scheduling rule, the results, which the function logic 140 obtains by processing the data, are returned to the functional unit FU 0. The output unit 130 may embodied, for example, as a hardware device or component which is configured to provide an output, or as a software module or program which is configured to provide an output.

The output unit 130 may include a buffer (not illustrated) which temporarily stores the results obtained via processing performed by the function logic 140. If the results obtained from the processing performed by the function logic 140 are outputted, the output unit 130 determines whether to transmit the results to the corresponding functional unit after delaying for a predetermined amount of time based on the scheduling rule, and if a predetermined amount of time for delay is required, the output unit 130 stores the processing results in the buffer. Afterward, if a predetermined amount of time passes, the output unit 130 may transmit the processing results which are stored in the buffer to the corresponding functional unit.

The functional unit which receives the processing results from the output unit 130 may use the results for processing the next operation. Further, the functional unit may transmit the received results to a register file or to another functional unit, so that the other functional unit can use the results to process another operation.

In another exemplary embodiment, the apparatus 100 for sharing a function logic may be designed to have one or more reconfigurable processors and corresponding hardware which facilitates a sharing of the functional unit, by being placed on the outside of a reconfigurable processor. Further, the reconfigurable processor may be embodied as one module.

Figure 2:
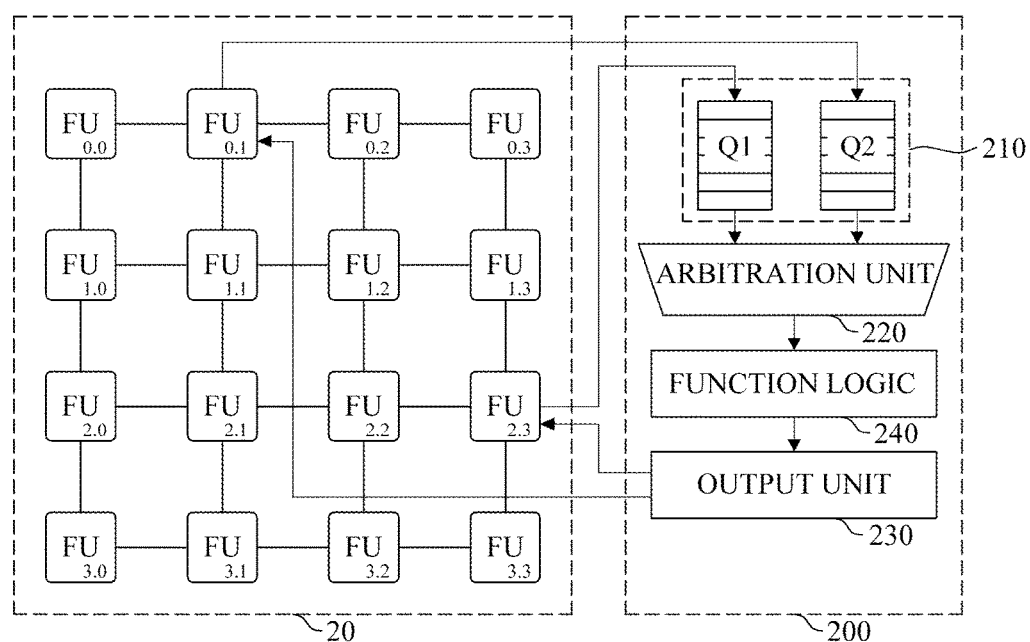
FIG. 2 is a diagram which illustrates an apparatus for sharing a function logic according to an exemplary embodiment.

FIG. 2 is a diagram which illustrates an apparatus for sharing a function logic according to an exemplary embodiment.

Referring to FIG. 2, in an exemplary embodiment, one reconfigurable processor 20 may be designed to share one function logic via an apparatus 200 for sharing function logic. In particular, two or more functional units $FU_{0,1}$, $FU_{2,3}$ which are included in one reconfigurable processor 20 may be connected to a storage unit 210 and an output unit 230 of the apparatus 200 for sharing function logic in order to share one function logic 240.

A storage unit 210 may include two or more queues Q1 and Q2, each of which stores respective data which received from a corresponding functional unit $FU_{0,1}$ and $FU_{2,3}$, which share a function logic 240. The storage unit 210 stores data which is received from each functional unit $FU_{0,1}$, $FU_{2,3}$, in each corresponding queue Q1 and Q2. The data which is received from each functional unit $FU_{0,1}$ and $FU_{2,3}$ may be held temporarily after being stored in the corresponding queue Q1 and Q2, until being transmitted to a function logic 240 after being selected by an arbitration unit 220.

The arbitration unit 220 may include a multiplexer, and may determine the following data to be processed from among data which is being temporarily held in each queue Q1 and Q2, according to a scheduling rule. Then, the arbitration unit 220 may transmit the determined data to the function logic 240.

The function logic 240 performs a predetermined operation by using data which is received from the arbitration unit 220, and outputs processed and obtained results.

If the results are outputted from the function logic 240, an output unit 230 transmits the results to a corresponding functional unit, that is, a functional unit which has inputted the data to be transmitted to the function logic 240 by the arbitration unit 220 in a queue.

In an exemplary embodiment, the output unit 230 may include a buffer, which is not illustrated in FIG. 2, and if the processing results are to be transmitted to the corresponding functional unit after a predetermined amount of time passes, the results may be temporarily stored in the buffer.

As illustrated in FIG. 2, if an input of the function logic 240 is generated in functional unit $FU_{0,0}$ of one reconfigurable processor 20, it is more efficient to transmit the generated input directly to the function logic via $FU_{0,1}$, which is relatively close to $FU_{0,0}$, than to transmit the generated input to the function logic via $FU_{2,3}$, which is relatively further away from the $FU_{0,0}$, with respect to a transmission time and a communication resource.

Referring to FIG. 2 as mentioned above, in an exemplary embodiment, the apparatus 200 for sharing a function logic may be designed as a hardware device which is separate from one reconfigurable processor 20. Further, in another exemplary embodiment, an apparatus for sharing a function logic is capable of being designed to be included in one reconfigurable processor 20 as one configuration module.

Figure 3:
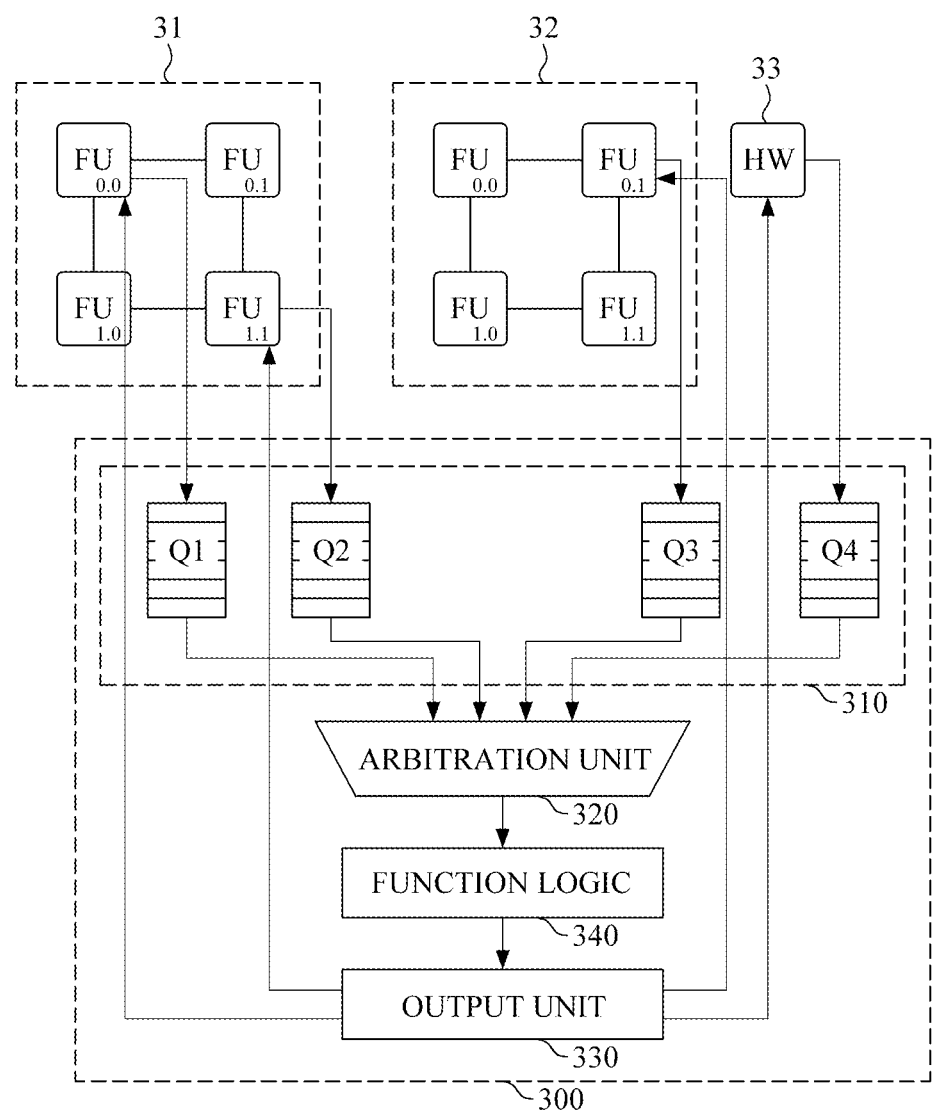
FIG. 3 is a diagram which illustrates an apparatus for sharing a function logic according to another exemplary embodiment.
Figure 4:
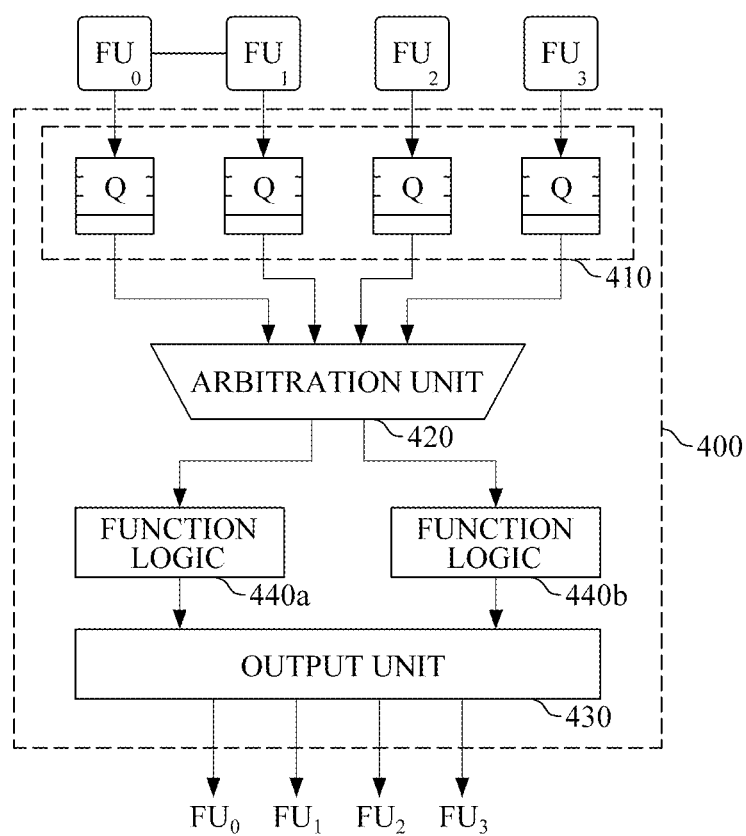
FIG. 4 is a diagram which illustrates an apparatus for sharing a function logic according to another exemplary embodiment.

FIG. 3 and FIG. 4 are diagrams which illustrate an apparatus for sharing a function logic according to other exemplary embodiments.

As illustrated in FIG. 3, in another exemplary embodiment, two or more reconfigurable processors 31 and 32, and hardware 33 that processes an additional operation, and the like, may be designed to share one function logic 340 via an apparatus 300 for sharing a function logic. In this exemplary embodiment, the apparatus 300 for sharing a function logic may be designed as separate hardware in order to enable a plurality of reconfigurable processors 31 and 32 and/or the hardware 33 that processes an additional operation, and the like, to share a function logic 240.

An apparatus 300 for sharing a function logic may include a storage unit 310, an arbitration unit 320 and an output unit 330. Specific descriptions are omitted hereafter because each component of the apparatus 300 for sharing a function logic may be understood similarly as described above.

Further, as illustrated in FIG. 4, in another exemplary embodiment, a plurality of functional units $FU_0$, $FU_1$, $FU_2$, $FU_3$, and $FU_4$ may be designed to share two or more function logics 400a and 400b via an apparatus 400 for sharing a function logic. In particular, the plurality of functional units $FU_0$ to $FU_4$ may be included in one reconfigurable processor, or each in two or more reconfigurable processors. In addition, each of the two or more function logics 440a and 440b may include a function logic which is configured to process an identical operation.

As described above, in a case where the two or more function logics 440a and 440b are capable of being configured in hardware, a waiting time of data which has been inputted to each queue of a storage unit 410 may be decreased if the operation is processed by sharing all the two or more function logics 440a and 440b. In particular, the data inputted to each queue of the storage unit 410 may be transmitted to the two or more function logics 440a and 440b by an arbitration unit 420, and then be processed in the two or more function logics 440a and 440b, and because results that are promptly processed by the two or more function logics 440a and 440b are transmitted to a corresponding functional unit by an output unit 430, a processing performance may be increased as compared with being processed by only one function logic.

Figure 5:
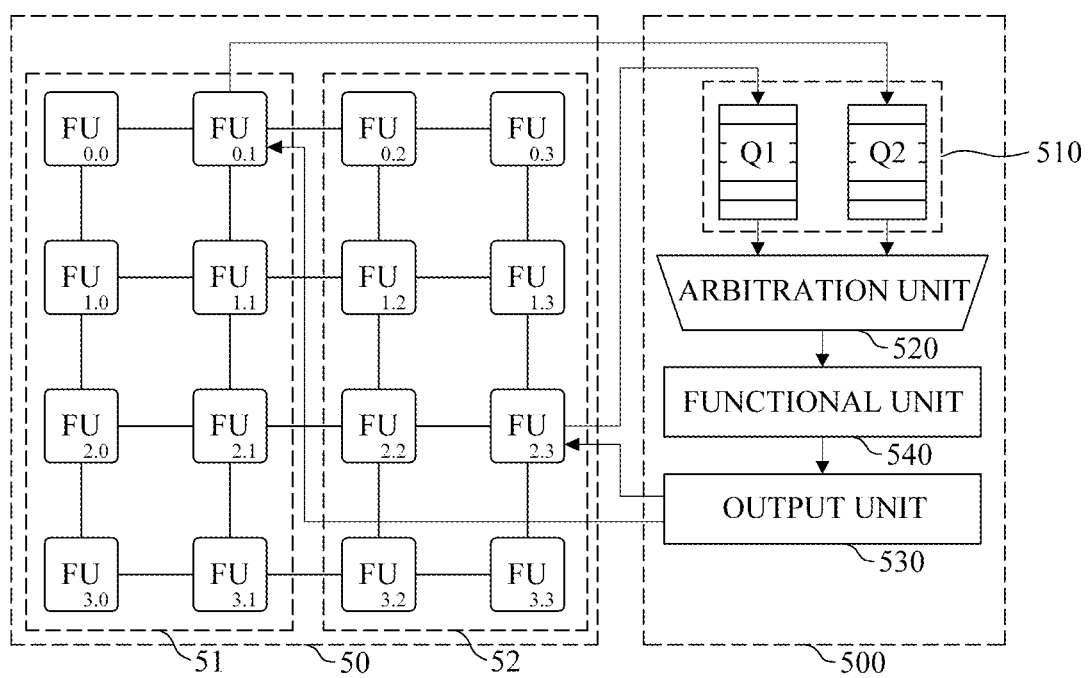
FIG. 5 is a diagram which illustrates an apparatus for sharing a function logic according to another exemplary embodiment.

FIG. 5 is a diagram which illustrates an apparatus for sharing a function logic according to another exemplary embodiment.

Referring to FIG. 5, one reconfigurable processor 50 may include two or more functional unit groups 51 and 52 in order to process two or more threads or tasks at the same time. In particular, a functional unit group 51 which is configured to process one of threads or tasks, and another functional unit group 52 which is configured to process other threads or tasks therewith at the same time, may all require results which are processed and obtained from a function logic 540 which processes predetermined operations. In this case, the function logic 540 may be shared by connecting predetermined functional units $FU_{0,1}$ and $FU_{2,3}$ which are included in each of functional unit groups 51 and 52 to an apparatus 500 for sharing a function logic.

In this exemplary embodiment, the apparatus 500 for sharing a function logic may include a storage unit 510, an arbitration unit 520, and an output unit 530. The specific description hereafter may be omitted because each component of the apparatus 500 for sharing a function logic may be understood according to the exemplary embodiments described above.

Generally, a general reconfigurable processor performs one task or one thread at a time. This is because processing several tasks or threads may be difficult due to a limitation of resources, such as a case of only one or a few functional units which process a predetermined operation. However, in the apparatus for sharing a function logic described above, the reconfigurable processor is capable of processing simultaneously by selecting tasks which have low parallelism of a command level, or which is easy or advantageous for scheduling in a relatively small-sized functional unit group. In addition, without assignment of high-cost-of-hardware operations to each functional unit group, such operations can be assigned to only one or a few functional units and be shared among all functional unit groups, and thereby cost reduction can be realized.

Figure 6:
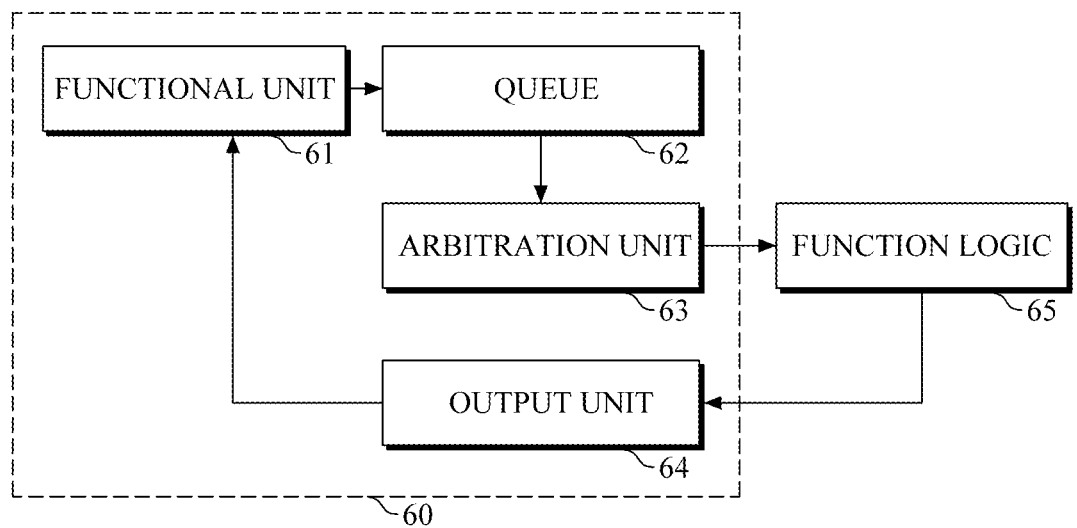
FIG. 6 is a block diagram which illustrates a reconfigurable processor according to an exemplary embodiment.

FIG. 6 is a block diagram which illustrates a reconfigurable processor according to an exemplary embodiment.

Referring to FIG. 1, FIG. 2, FIG. 3, FIG. 4, FIG. 5, and FIG. 6, various exemplary embodiments of an apparatus for sharing a function logic are described above. The apparatus for sharing a function logic may be designed as hardware which is separate from one or more reconfigurable processors. However, in an exemplary embodiment illustrated in FIG. 6, the apparatus may be designed to be included in one reconfigurable processor.

Referring to FIG. 6, a reconfigurable processor may include a plurality of functional units 61, two or more queues 62, an arbitration unit 63, and an output unit 64.

Similarly as described above with reference to FIG. 2, a reconfigurable processor 60 may be designed or configured to have two or more functional units out of a plurality of functional units 61 share a function logic 65, so as to process an operation by sharing the function logic 65 which processes a predetermined operation.

A predetermined functional unit 61 or a functional unit which is connected to a function logic of the reconfigurable processor 60 may transmit data which has been received by the function logic 65 to a queue 62 via the connected functional unit, if the predetermined operation is required by the function logic 65.

Some of the data transmitted to and stored in the queue 62 is selected and transmitted by the arbitration unit 63 to the function logic 65, and the function logic 65 processes the transmitted data. The function logic 65 performs an operation by using the transmitted data and outputs operation results.

The output unit 64 transmits the operation results from the function logic 65 to the original functional unit 61. Although not illustrated, the output unit 64 may include a temporary buffer, and the operation results from the function logic 65 may be transmitted to the functional unit 61 after being stored in the temporary buffer for a predetermined amount of time.

Further, similarly as described above with reference to FIG. 5, the reconfigurable processor 60 may separate a plurality of functional units 61 into two or more functional unit groups, so as to process two or more threads or tasks at the same time, and may process two or more threads simultaneously by connecting the respective functional unit which is included in each corresponding functional unit group to the function logic 61.

Figure 7:
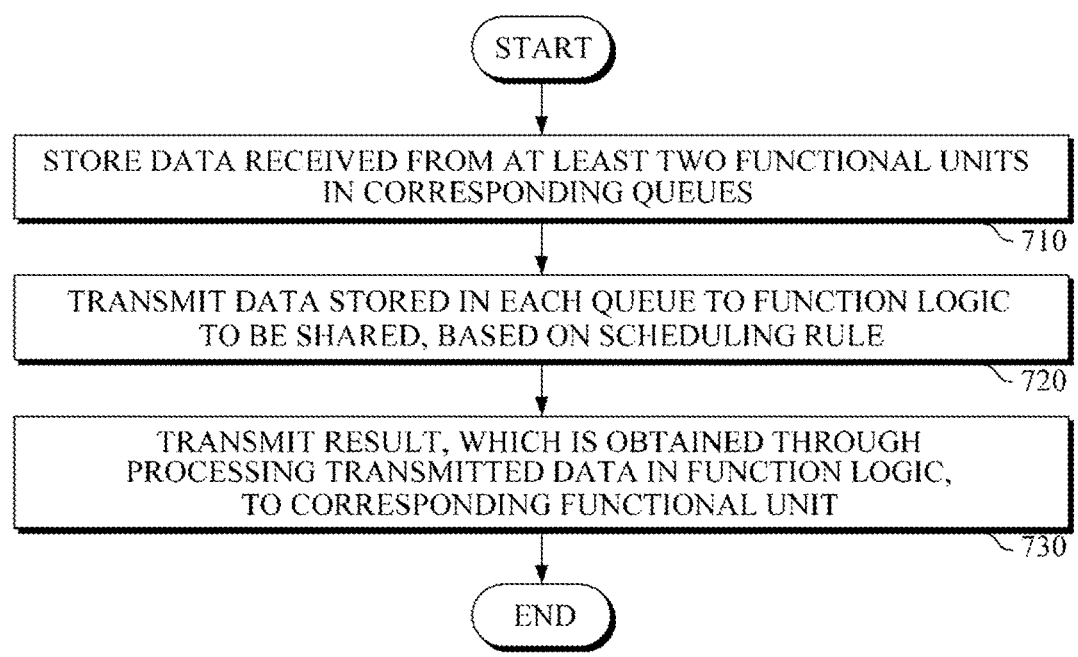
FIG. 7 is a flow chart which illustrates a method for sharing a function logic according to an exemplary embodiment.

FIG. 7 is a flow chart which illustrates a method for sharing a function logic according to an exemplary embodiment.

Referring to FIG. 7, a method for sharing a function logic which is performable by using the apparatus 100 for sharing a function logic as illustrated in FIG. 1 is described hereafter.

In operation 710, the apparatus 100 for sharing a function logic stores data which is received from two or more functional units or data which is received from the hardware in two or more corresponding queues. In particular, the two or more functional units may be included in one reconfigurable processor. Alternatively, each of the two or more functional units may be respectively included in a corresponding one of two or more reconfigurable processors. Further, each of the two or more functional units may be included in a respective functional unit group, if separated into two or more functional unit groups in order to process two or more threads or tasks at the same time in one reconfigurable processor.

Then, in operation 720, the apparatus 100 for sharing a function logic may transmit data which is stored in each queue to at least one function logic which processes a predetermined operation, based on a scheduling rule. The scheduling rule may include information which relates to a processing order of data which is received from each functional unit. The at least one function logic may include more than one function logic, and if designed to share two or more function logics, each function logic may perform an identical operation. The apparatus 100 is capable of processing promptly by processing the predetermined operation by sharing two or more function logics which process the identical operations.

Finally, in operation 730, the apparatus transmits processed and obtained results from the at least one function logic to the corresponding functional unit. Further, the processed and obtained results may be transmitted to the corresponding functional unit after being stored in a temporary buffer for a predetermined amount of time.

The methods and/or operations described above may be recorded, stored, or fixed in one or more transitory or non-transitory computer-readable storage media that includes program instructions to be implemented by a computer to cause a processor to execute or perform the program instructions. The media may also include, alone or in combination with the program instructions, data files, data structures, and the like.

Examples of computer-readable storage media include magnetic media, such as hard disks, floppy disks, and magnetic tape; optical media such as compact disk—read-only memory (CD ROM) disks and digital versatile disks (DVDs); magneto-optical media, such as optical disks; and hardware devices that are specially configured to store and perform program instructions, such as read-only memory (ROM), random access memory (RAM), flash memory, and the like. Examples of program instructions include machine code, such as that produced by a compiler, and files containing higher level code that may be executed by the computer by using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. Further, functional programs, codes and code segments to implement those exemplary embodiments may be easily inferred by programmers who are skilled in the related art.

Those who are skilled in the related art may understand that various and specific modifications may be made without modifying the technical ideas or essential characteristics of the present inventive concept. Accordingly, the embodiments disclosed above are exemplary, and should be understandable not to be limited to in all aspects.

What is claimed is:

1. An apparatus for sharing a function logic, the apparatus comprising:
   a storage which is configured to store data which is received from at least two functional units in order to share at least one function logic; and
   an arbitrator which is implemented as a processor and which is configured to transmit the stored data to each of the at least one function logic, based on a scheduling rule,
   wherein each of the at least one function logic is configured to perform a same operation with respect to each data which is received from the at least two functional units, and
   wherein the apparatus further comprises an output device which is configured to temporarily store, in a buffer, at least one result obtained by the at least one function logic and, based on the scheduling rule, to delay an outputting of the obtained at least one result for a predetermined amount of time, and to output the obtained at least one result after the predetermined amount of time passes,
   wherein each functional unit of the at least two functional units belongs to a respective functional unit group of at least two functional unit groups, and
   wherein a first functional unit group and a second functional unit group of the at least two functional unit groups are configured to concurrently process a first task and a second task, respectively.

2. The apparatus of claim 1, wherein the at least two functional units are included in at least one reconfigurable processor.

3. The apparatus of claim 1, wherein each respective one of the at least two functional units belongs to a corresponding one of at least two functional unit groups which are configured to concurrently process at least two tasks in one reconfigurable processor.

4. The apparatus of claim 1, wherein the storage comprises at least two queues which respectively correspond to the at least two functional units, and which are configured to store the data to be transmitted from each of the at least two functional units to the at least one function logic.

5. The apparatus of claim 4, wherein the storage comprises at least one queue which is configured to store data to be transmitted to the at least one function logic from at least one hardware device that shares the at least one function logic.

6. The apparatus of claim 1, wherein in case at least two functional units share at least two function logics, each of the at least two function logics is configured to perform a same operation.

7. A reconfigurable processor comprising:
   a plurality of functional units;
   at least two queues which are respectively configured to store data which is received from a corresponding one of at least two functional units from among the plurality of functional units, the at least two functional units being connected in order to share at least one function logic;
   an arbitrator which is configured to transmit the stored data to the at least one function logic, based on a scheduling rule; and
   an output device which is configured to transmit at least one result which is obtained by the at least one or more function logic via processing the data which is transmitted by the arbitrator to each of the at least two functional units,
   wherein each of the at least one function logic is configured to perform a same operation with respect to data which is received from the at least two functional units, and
   wherein the output unit is further configured to temporarily store, in a buffer, the obtained at least one result and, based on a scheduling rule, to delay the transmission of the obtained at least one result for a predetermined amount of time, and to output the obtained at least one result after the predetermined amount of time passes, and
   wherein each functional unit of the at least two functional units belongs to a respective functional unit group of at least two functional unit groups, and
   wherein a first functional unit group and a second functional unit group of the at least two functional unit groups are configured to concurrently process a first task and a second task, respectively.

8. The reconfigurable processor of claim 7, wherein each of the plurality of functional units is designated as belonging to a respective one of at least two functional unit groups which are configured to concurrently process at least two tasks, and wherein each respective one of the at least two functional units is included in a corresponding one of the at least two functional unit groups.

9. A method for sharing a function logic, the method comprising:
   storing data, which is received from at least two functional units in order to share at least one function logic, in a respective one of at least two queues which correspond to the at least two functional units; and
   transmitting the stored data to the at least one function logic based on a scheduling rule,
   wherein each of the at least one function logic is configured to perform a same operation with respect to each data which is received from the at least two functional units,
   wherein the method further comprises temporarily storing at least one result obtained by the at least one function logic and applying the scheduling rule to determine a delay time for the temporary storage of the obtained at least one result and a corresponding transmission time for transmitting the obtained at least one result, based on the scheduling rule, to delay an outputting of the obtained at least one result, and to output the obtained at least one result after the predetermined amount of time passes, and
   wherein each functional unit of the at least two functional units belongs to a respective functional unit group of at least two functional unit groups, and
   wherein a first functional unit group and a second functional unit group of the at least two functional unit groups are configured to concurrently process a first task and a second task, respectively.

10. The method of claim 9, wherein the at least two functional units are included in at least one reconfigurable processor.

11. The method of claim 9, wherein each respective one of the at least two functional units belongs to a corresponding one of at least two functional unit groups which are configured to concurrently process at least two tasks in one reconfigurable processor.

12. The method of claim 9, wherein in case at least two functional units share at least two function logics, each of the at least two function logics is configured to perform a same operation.

13. A function-executing apparatus, comprising:
an arbitration processor which is configured to access first data which is received from a first functional unit and to access second data which is received from a second functional unit;
a function processor which is configured to receive the first data and the second data from the arbitration processor and to execute a function with respect to the received first data and the received second data, wherein the function processor is further configured to execute a same function with respect to the received first data and the received second data; and
an output device which is configured to receive at least one result of the executed function from the function processor and to output the received at least one result,
wherein the arbitration processor is further configured to determine an order for transmission of the first data and the second data to the function processor based on a scheduling rule, and
wherein the output device is further configured to temporarily store, in a buffer, the received at least one result and, based on the scheduling rule, to delay a transmission of the obtained at least one result for a predetermined amount of time, and to output the obtained at least one result after the predetermined amount of time passes, and
wherein the function-executing apparatus further comprises a first queue which is configured to store the first data and a second queue which is configured to store the second data, and wherein the arbitration processor is further configured to access the first data from the first queue at a first time based on the scheduling rule, and to access the second data from the second queue at a second time based on the scheduling rule.

14. The apparatus of claim 13, further comprising a first queue which is configured to store the first data and a second queue which is configured to store the second data, wherein the arbitration processor is further configured to access the first data from the first queue at first time based on the scheduling rule, and to access the second data from the second queue at a second time based on the scheduling rule.

15. The apparatus of claim 13, wherein the output device is further configured to apply the scheduling rule to determine a transmission time for transmitting the at least one result to at least one from among the first functional unit and the second functional unit, and to transmit the at least one result based on the determined transmission time.

16. The apparatus of claim 13, wherein the arbitration processor is further configured to access at least third data which is received from at least a third functional unit and to apply the scheduling rule to determine an order for transmission of the at least third data to the functional processor, and wherein the functional processor is further configured to receive the at least third data from the arbitration processor and to execute the function with respect to the received first data, the received second data, and the received at least third data.

17. A method for executing a function, the method comprising:
receiving first data from a first functional unit and receiving second data from a second functional unit;
determining an order for processing each of the received first data and the received second data based on a scheduling rule;
executing the function with respect to the received first data and the received second data based on the determined order for processing, wherein the executing comprises performing a same operation with respect to the received first data and the received second data;
obtaining at least one result of the executed function; and
temporarily storing, in a buffer, the obtained at least one result and, based on the scheduling rule, delaying an outputting of the obtained at least one result for a predetermined amount of time, and outputting the obtained at least one result after the predetermined amount of time passes,
wherein the outputting the obtained at least one result comprises applying the scheduling rule to determine a transmission time for transmitting the obtained at least one result, and
wherein the method further comprises storing the first data in a first queue and storing the second data in a second queue, and wherein the determining the order for processing comprises applying the scheduling rule to determine a first delay which relates to a timing for processing the first data and a second delay time which relates to a timing for processing the second data.

18. The method of claim 17, further storing the first data in a first queue and storing the second data in a second queue, wherein the determining the order for processing comprises applying the scheduling rule to determine a first delay time which relates to a timing for processing the first data and a second delay time which relates to a timing for processing the second data.

19. The method of claim 17, further comprising receiving at least third data from at least a third functional unit, determining an order for processing the received at least third data based on the scheduling rule, and executing the function with respect to the received first data, the received second data, and the received at least third data based on the determined order for processing.

* * * * *